April 19, 1938. H. R. HORNER 2,114,381
CLOSURE SEALING MEANS FOR CYLINDERS AND THE LIKE
Filed May 6, 1936 2 Sheets-Sheet 1
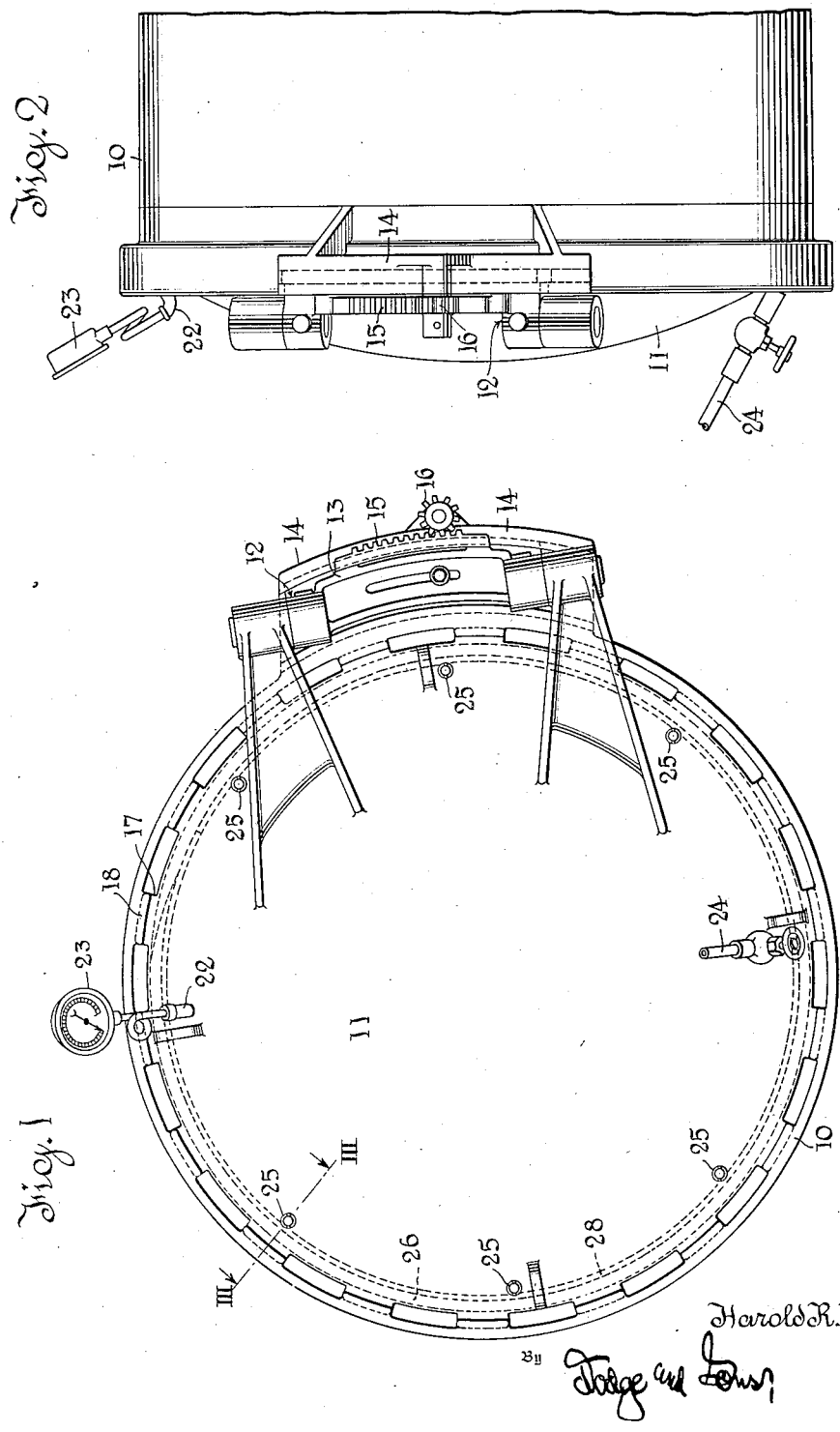
Inventor:
Harold R. Horner,
By Judge and Lowry,
Attorneys

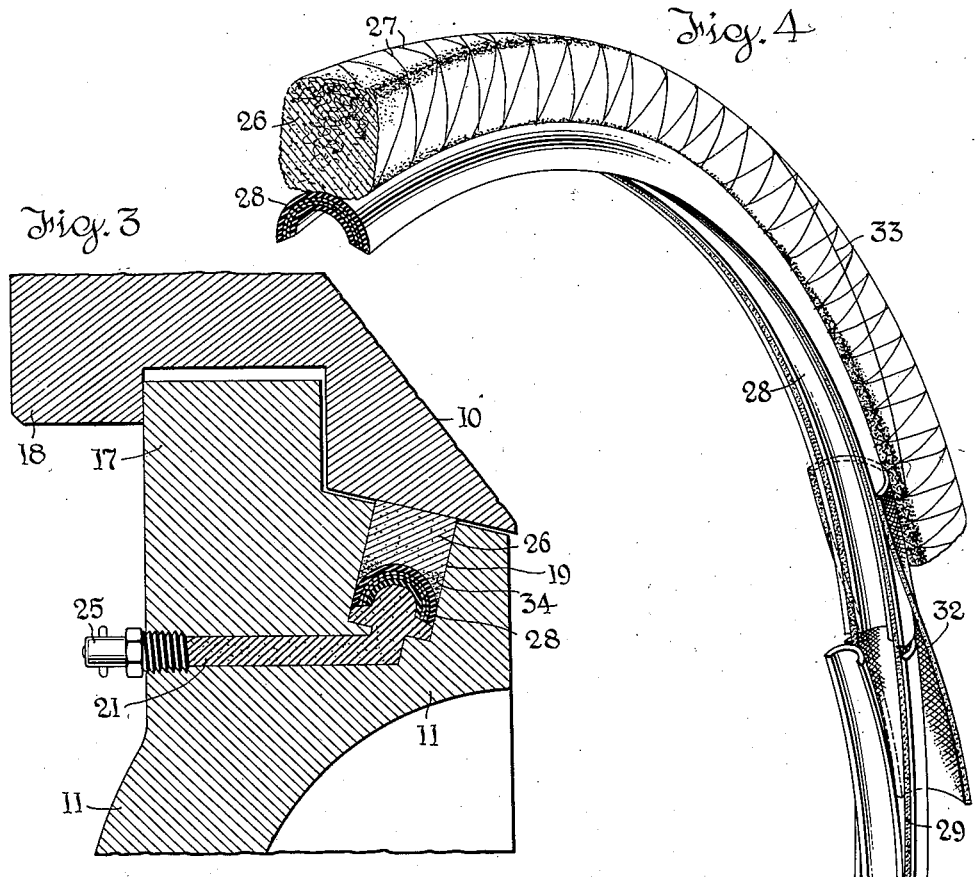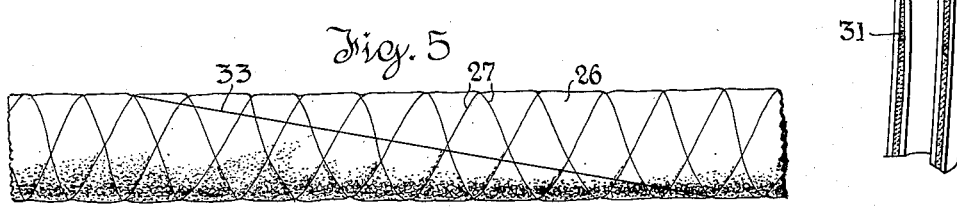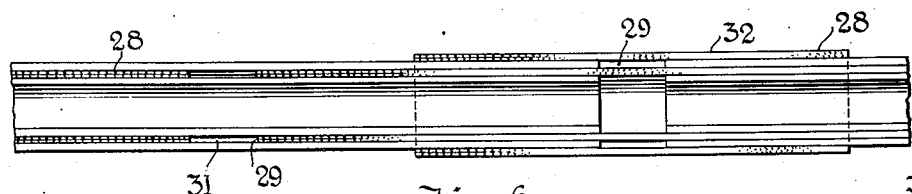

Patented Apr. 19, 1938

2,114,381

UNITED STATES PATENT OFFICE 2,114,381

CLOSURE SEALING MEANS FOR CYLINDERS AND THE LIKE

Harold R. Horner, Indianapolis, Ind., assignor to Peter C. Reilly, Indianapolis, Ind.

Application May 6, 1936, Serial No. 78,285

2 Claims. (Cl. 220—46)

This invention pertains to means for sealing closures which are subject to pressure or the action of a vacuum, and relates more particularly to the sealing of a door of a cylinder such as is employed for treating timbers with creosote or like impregnating materials.

Cylinders employed for the purpose just mentioned are subject to both pressure and vacuum in succession and, moreover, the material employed as an impregnating agent is usually such that it will attack many materials which are sought to be utilized as sealing gaskets between the door and the mouth or open end of the cylinder. Not only does the impregnating liquid by reason of its chemical composition attack the gasket structure, but the heat which is necessary and commonly employed in conjunction with these treating cylinders has a tendency to destroy the sealing gaskets by the heat alone, and where the impregnating liquid has a deterrent action upon the gasket, the difficulty which arises in sealing such a cylinder is accentuated.

The present invention solves the difficulty above adverted to and produces a seal between the head and the cylinder which is stable and effective against the action of the liquid or fluid employed as the sealing medium, against the pressure exerted thereby against the gasket while the liquid or cylinder is under pressure, and also against the action of a vacuum which is commonly employed in the cycle of impregnating a piece of timber or timbers.

The temperatures to which the gasket or sealing material is exposed may run as high as 260° F., hence a gasket or sealing element which will withstand this heat must necessarily be employed to produce a proper sealing between the closure and the cylinder.

I am aware that various means have heretofore been proposed to effect a tight joint or seal between a cylinder and the closure or door therefor, such as rubber gaskets having a special form or contour in cross section designed to be acted upon by the pressure exerted within the cylinder. Where, however, the liquid which is employed to impregnate the timber has a deleterious effect upon the packing or gasket and where, furthermore, the heat of the impregnating liquid also affects such sealing gasket adversely, it is impossible to employ a door of the quick opening type, but on the other hand, it has heretofore been found necessary to employ a door which is drawn or forced to its seat directly by being bolted to the cylinder. This latter form is quite common, but as will be appreciated, the placement and removal of the cylinder head or heads is necessarily time-consuming.

The present packing and method of effecting an adequate seal under all conditions may be applied to the type of closure just mentioned, but preferably it is employed with a head or closure having a lock of the bayonet and socket type, such for instance as shown in U. S. Letters Patent No. 1,226,766 to Gammeter, dated May 22, 1917.

So much of a cylinder and one head as is necessary to an understanding of the invention and also the packing of my invention, is shown in the annexed drawings, wherein:—

Figure 1 is an end view of a cylinder, a door or closure therefor and the door support, together with the mechanism to lock and release the same;

Fig. 2, a side elevation thereof;

Fig. 3, a detail sectional view on the line III—III of Fig. 1, and on an enlarged scale, wherein the packing is shown in sealing relation between the cylinder and closure;

Fig. 4, a perspective view of a portion of the seal other than the hydraulic means employed to force and hold the same in sealing relation;

Fig. 5, a plan view of a portion of one of the packing elements, or more specifically the main sealing element which is forced and bears against the cylinder wall; and Fig. 6, a detail plan view of another element of the seal.

Somewhat broadly stated, the seal may be said to comprise a cylinder wall contacting element preferably carried by the closure and adapted to be forced outwardly through the action of hydraulic means into sealing relation with such wall, the arrangement being such that the seal is effective under the action of either pressure or vacuum which may obtain within the cylinder.

Referring to the drawings, 10 denotes a cylinder and 11 the head or closure therefor. These parts are arranged as in the patent above specified, that is to say the closure 11 is mounted upon a hinged structure denoted generally by 12, carried by a framework 13 slidably mounted in a guideway 14 formed as an outward extension upon the adjacent end of the cylinder. The slide is provided with a rack 15 meshing with a pinion 16 mounted upon a shaft which is carried by the extension 14. This arrangement permits the door to be moved about its axis and in so doing to cause the bayonet-like lugs or projections 17 to pass inwardly beneath the teeth or projections 18 formed upon the cylinder head. Any form of door support and fastening means may, however, be employed insofar as this invention is concerned.

As will be seen upon reference to Fig. 3, the head 11 is provided with an annular groove or channel as 19 in which the packing element, hereinafter more specifically described, is seated. The groove or channel at its lower portion is in communication with a plurality of outwardly extending passages 21 spaced about the face of the closure member 11 (see Fig. 1). In one of these openings is mounted a fitting as 22 to which a pressure gauge 23 is attached. One of the other openings, preferably the lower one, has attached thereto a valve drain pipe as 24. The other openings are provided with suitable self-closing plugs 25 adapted to receive and coact with a suitable pressure gun (not shown) for forcing a fluid into the passages 21 and thence into the lower part of the groove 19.

Within the groove is seated the packing, which may be said to comprise a flexible heat resisting and yielding element (or elements) designed to be forced into direct and sealing contact with the adjacent wall or face of the cylinder through the pressure of fluid medium forced inwardly beneath the same through one or more of the fittings 25.

Preferably the main sealing element will be formed from asbestos fiber or rope denoted generally by 26 and held against undue deformation by light wires 27 wound about the same. The member 26 is of a width such as to substantially fill the groove when first inserted and to completely fill the width of the groove when subjected to pressure from the outer face thereof. Underlying the member 26 is a pressure applying element substantially U-shaped in cross section and denoted generally by 28. This element preferably is formed from high grade rubber hose split lengthwise and is of such length as to extend entirely around the groove 19. At the ends the plies are separated and cut away so as to produce a tongue 29 and a socket or recess 31 between the inner and outer layers of the member 28, designed to receive said tongue (as best shown in Fig. 6).

When the parts are assembled, the ends of the outer ply or layer of the hose are separated only for a slight extent. Overlying the joint between the ends of the outer plies is a shoe or separate U-shaped element 32, (best shown in Fig. 4).

The edges of the component elements of the pressure applying member 28 are inwardly beveled, although this is not essential. It will be appreciated that materials other than rubber or rubber strengthened with various fibers, such as cotton or the like, may be utilized. Thus for instance, asbestos sheeting may be employed, although the rubber hose cut to form has given highly satisfactory results in actual and somewhat prolonged use.

By cutting the member 26 on a bevel or diagonal with the tapered ends overlapping, as indicated by the line 33 (Fig. 4), and producing a tortuous or interrupted passage between the various layers of the pressure applying element 28, seepage of the pressure liquid or fluid employed to force the seal to its seat or to prevent the outflow of fluid from the cylinder is prevented. This latter, however, is precluded by the close contact between the member 26 and the adjacent face of the cylinder when the seal is fully seated.

In practice, it is designed to force a liquid through one or more of the fittings 25 into the passages 21 and upwardly into the groove and beneath the pressure applying element 28.

By having the ends of the pressure applying member overlapping, as above described, it may readily expand upon sliding or slippage of the parts at their joint rather than depending upon the flexibility of rubber, asbestos or the like when subjected to pressure. The cutting of the member 26 upon a bevel or incline also allows slippage without disruption.

Outward of or below the pressure applying member 28 I propose to force an hydraulic medium, the pressure being sufficient to force the pressure applying element 28 outwardly into direct contact with the member 26 as best shown in Fig. 3, and to thereby deform the member 26 so that it will fully fill the outer portion of the channel 19 and carry the outer face thereof into direct sealing contact with the adjacent wall of the cylinder head.

The sealing medium or gasket above described is flexible or elastic to such an extent that it may be forced to its seat without difficulty. Moreover, the material will not fail under heat and chemical action of the materials ordinarily utilized in the treatment or impregnation of timbers. The asbestos element 26 precludes creosote, if that be the material employed, from passing downwardly into the channel 19 and contacting the rubber elements of the pressure applying member, if rubber be employed, to such an extent as to cause deterioration thereof.

In order to effect a complete and equal expansion of the packing or sealing element 26 throughout its entire length or circumference, I employ an hydraulic medium which may be forced into the groove below the pressure applying element 28 through one or more of the fittings 25. Preferably a pressure gun will be applied to each of the openings in succession in order to insure the setting up of sufficient and proper pressure within the channel 19 below the pressure applying element 28. It is necessary, of course, that this material be fluid at ordinary temperatures; also that it be fluid at maximum operating temperatures of approximately 260° F.

The hydraulic medium which I employ preferably has a flat face viscosity curve over the operating temperature say from 0° F. to 260° F. A great variety of liquids and greases were tried out but it was found that if they were fluid at the lower temperature, their viscosity dropped to such a point that it was impossible to hold them at operating pressures and temperatures with the expanding seal or gasket.

Finally, there was used with success a rosin soap mixed with asbestos flour. By way of explanation and not limitation, the formula may be expressed as follows:

| | Pounds |
|---|---|
| Rosin | 26.8 |
| Dry caustic soda | 3.2 |
| Water | 12 |
| Glycerin | 2 |
| Asbestos flour | 8 |

The rosin soap is made by melting the rosin with about 10 lbs. of the water and the caustic soda. The glycerin and remaining water along with the asbestos flour is added after the soap is made. It was also ascertained that the standard rosin soap mixtures on the market could be used with the addition of glycerin, water and asbestos flour. The glycerin tended to hold the water in the soap at the elevated temperatures employed in the impregnating operation, and the asbestos flour seemingly acts as a secondary seal.

In operation when the door is closed and the gasket is being put under pressure for the first time, there is some leakage around the lap joint of the expanding seal gasket 26. However, as the rosin soap leaks through the openings, the asbestos flour, due to its larger particle size, is entrained or tends to filter out and fill up the voids and leaks. On continued operation, this action builds up a secondary seal, denoted by 34 in Fig. 3. This secondary seal extends entirely around the groove lying within the angular space which is outlined between the lower face of the member 26 and the upper curved portion or sides of the pressure applying member 28.

Some of the hydraulic body, together with the asbestos flour will, of course, pass upwardly between the outer face of the pressure applying member 28 and the adjacent wall of the groove to each side of said pressure applying member. However, as soon as the gasket 26 is seated and compression and movement thereof ceases, this space becomes shut off from the hydraulic pressure below the member 28, and said member 28 then tends to expand outwardly into close contact with the side walls of the groove.

If on continued operation the rosin soap, if that be the fluid pressure medium relied upon to bring about the expansion of the gasket, becomes hard, water may be added thereto until the viscosity is reduced to the desired amount.

By utilization of the pressure gauge 23 the operator can readily determine when the door is properly sealed, and when it is desired to open the door, the valved pipe 24, is opened to relieve the pressure. When the pressure gauge shows 0, the pinion 16 may be actuated to unlock the door through the operation upon the rack 15, releasing the door lugs and permitting the door to be swung open upon the hinges 12.

While I have spoken of treating timbers and using creosote, it will be readily appreciated that the apparatus and the method of sealing the cylinder is not to be limited to such.

Again, the door mounting is unessential and even with a bolted-in-place door structure, a gasket produced as above described and forced to position through hydraulic pressure may be utilized to advantage.

The term "cylinder" as herein employed and as it appears hereinafter in the claims, is not to be understood as limiting the invention to a cylindrical treating chamber. Such chamber may be of any cross section with the closure or closures made to conform therewith.

What is claimed is:

1. In combination, a hollow chamber adapted to be subjected to temperatures substantially in excess of the boiling point of water, the wall of said chamber having an opening therein; a closure for said opening; a channel in one of said members; a gasket in said channel adapted to engage the other of said members when the closure is positioned to seal said opening, said gasket being of such width as to tightly engage the walls of the channel; a liquid in said channel beneath said gasket, said liquid being inert with respect to media in said chamber, and having a substantially flat viscosity curve and capable of remaining in a liquid state between room temperature and temperatures substantially in excess of the boiling point of water, said liquid comprising a rosin soap carrying asbestos fibers; and means for subjecting said liquid to pressure to force the gasket into sealing relation with said other member.

2. In combination, a hollow chamber for the impregnation of wood with creosote oil, and adapted to be subjected to temperatures substantially in excess of the boiling point of water, the wall of said chamber having an opening therein; a closure for said opening; a channel in one of said members; a gasket in said channel adapted to engage the other of said members when the closure is positioned to seal said opening, said gasket being of such width as to tightly engage the walls of the channel; a liquid in said channel beneath said gasket, said liquid being inert with respect to media in said chamber and having as its principal constituent rosin soap, said liquid being characterized by having a substantially flat viscosity curve and being capable of remaining in a liquid state between room temperatures and temperatures materially in excess of the boiling point of water; and means for subjecting said liquid to pressure to force the gasket into sealing relation with said other member.

HAROLD R. HORNER.